US012027769B2

(12) United States Patent
Zhou et al.

(10) Patent No.: US 12,027,769 B2
(45) Date of Patent: Jul. 2, 2024

(54) ANTENNA AND WIRELESS DEVICE

(71) Applicant: Huawei Technologies Co., Ltd., Shenzhen (CN)

(72) Inventors: Xiao Zhou, Shanghai (CN); Zui Tao, Nanjing (CN); Jie Zhao, Nanjing (CN); Shuguang Xiao, Shenzhen (CN); Xin Luo, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/722,811

(22) Filed: Apr. 18, 2022

(65) Prior Publication Data

US 2022/0336961 A1 Oct. 20, 2022

(30) Foreign Application Priority Data

Apr. 19, 2021 (CN) ......................... 202110420616.4

(51) Int. Cl.
*H01Q 19/10* (2006.01)
*H01P 1/185* (2006.01)

(52) U.S. Cl.
CPC ........... *H01Q 19/106* (2013.01); *H01P 1/185* (2013.01)

(58) Field of Classification Search
CPC .... H01Q 15/002; H01Q 15/162; H01Q 15/14; H01Q 3/24; H01Q 19/106; H01P 1/185
See application file for complete search history.

(56) References Cited

U.S. PATENT DOCUMENTS

| | | | | | |
|---|---|---|---|---|---|
| 5,166,857 | A * | 11/1992 | Avanic | H01G 7/06 | 361/280 |
| 5,877,726 | A * | 3/1999 | Kudoh | H01Q 3/24 | 342/175 |
| 7,358,912 | B1 * | 4/2008 | Kish | H01Q 9/16 | 343/727 |
| 8,933,853 | B2 * | 1/2015 | Asanuma | H01Q 9/26 | 343/702 |
| 10,270,185 | B2 * | 4/2019 | Boutayeb | H01Q 9/285 | |
| 10,784,577 | B2 * | 9/2020 | Wu | H01Q 9/18 | |
| 11,165,158 | B2 * | 11/2021 | Wu | H01Q 21/26 | |
| 2002/0021185 | A1 * | 2/2002 | Atokawa | H01P 1/2056 | 333/202 |
| 2002/0021257 | A1 * | 2/2002 | Zimmerman | H01Q 21/24 | 343/793 |
| 2004/0027304 | A1 * | 2/2004 | Chiang | H01Q 3/446 | 343/810 |

(Continued)

FOREIGN PATENT DOCUMENTS

| | | | | | |
|---|---|---|---|---|---|
| CN | 104852150 | A * | 8/2015 | H01Q 1/246 |
| EP | 1035614 | A2 * | 9/2000 | H01Q 19/28 |

(Continued)

*Primary Examiner* — Ricardo I Magallanes
*Assistant Examiner* — Jordan E. DeWitt
(74) *Attorney, Agent, or Firm* — Conley Rose, P.C.

(57) ABSTRACT

An antenna has a reflector and an active element. The reflector includes a multi-segment metal structure having a length within a first value range. The multi-segment metal structure includes a first metal structure connected to a second metal structure. A PIN diode is disposed on the first metal structure. The first metal structure is parallel to a polarization direction of the active element. The second metal structure is perpendicular to the first metal structure.

20 Claims, 9 Drawing Sheets

(56) References Cited

U.S. PATENT DOCUMENTS

2004/0257292 A1* 12/2004 Wang .................. H01Q 15/148 343/834
2005/0237258 A1* 10/2005 Abramov ............ H01Q 21/205 343/834
2006/0109191 A1* 5/2006 Shtrom .................. H01Q 9/28 343/876
2007/0291205 A1* 12/2007 Hsu .................. G02F 1/133555 349/114
2008/0305749 A1* 12/2008 Ben-Bassat ............. H04B 1/18 343/745
2010/0103065 A1* 4/2010 Shtrom ................. H01Q 3/446 343/893
2010/0141530 A1* 6/2010 McMahon ............ H01Q 5/378 342/417
2011/0090131 A1* 4/2011 Chen ..................... H01Q 5/49 343/815
2012/0274524 A1* 11/2012 Piazza ................... H01Q 23/00 343/745
2014/0087673 A1* 3/2014 Mostov .................... H03F 3/21 455/78
2014/0117515 A1* 5/2014 Lachner ................. H01L 24/12 257/664
2014/0118191 A1* 5/2014 Smith ................... H01Q 3/242 342/372
2014/0125523 A1* 5/2014 Bauman .................. H01Q 9/16 342/368
2015/0349418 A1* 12/2015 Patron ..................... H01Q 3/44 343/836
2015/0357711 A1* 12/2015 Manasson ............... H01Q 3/32 342/374
2015/0380814 A1* 12/2015 Boutayeb .............. H01Q 15/14 29/601
2016/0261050 A1* 9/2016 Sharawi .................. H01Q 9/42
2016/0302081 A1* 10/2016 Liu ........................ H01Q 21/29
2016/0372839 A1* 12/2016 Watson ................... H01Q 9/42
2017/0025740 A1* 1/2017 Li ......................... H01Q 1/243
2017/0033471 A1* 2/2017 Huang ................ H01Q 1/2291
2018/0040961 A1* 2/2018 Oshima ................... H01Q 1/38
2018/0175515 A1* 6/2018 Boutayeb .............. H01Q 21/30
2018/0342807 A1* 11/2018 Watson ............... H01Q 9/0421
2019/0027814 A1* 1/2019 Hsu ........................ H01Q 1/246
2019/0058254 A1* 2/2019 Zhu ........................ H01Q 19/28
2019/0214960 A1* 7/2019 Le ........................ H03H 7/0161
2019/0245278 A1* 8/2019 Hsieh ..................... H01Q 1/521
2019/0305431 A1* 10/2019 Islam ..................... H01Q 1/243
2019/0379120 A1* 12/2019 Manasson ........... H01Q 21/245
2020/0044356 A1* 2/2020 Mallegol ............... H01Q 17/00
2020/0287297 A1* 9/2020 Boutayeb ................ H01Q 1/36
2020/0303840 A1* 9/2020 Singh ..................... H01Q 19/28
2021/0184362 A1* 6/2021 Hong Loh ............... H01Q 1/48
2021/0194142 A1* 6/2021 Marnat .................. H01Q 13/18
2022/0216606 A1 7/2022 Yu et al.
2022/0336961 A1* 10/2022 Zhou .................... H01Q 1/2291

FOREIGN PATENT DOCUMENTS

EP 3444897 A1 * 2/2019 ............... H01Q 1/22
JP 2001036337 A * 2/2001 ............. H01Q 19/28
WO 2021057627 A1 4/2021

* cited by examiner

ANTENNA AND WIRELESS DEVICE

CROSS-REFERENCE TO RELATED APPLICATIONS

This application claims priority to Chinese Patent Application No. 202110420616.4, filed on Apr. 19, 2021, which is hereby incorporated by reference in its entirety.

TECHNICAL FIELD

This application relates to the wireless communications field, and in particular, to an antenna and a wireless device.

BACKGROUND

With rapid development of a modern communications system, as a new type of antenna, a reconfigurable antenna has become a research focus in the communications system. The reconfigurable antenna mainly implements antenna performance reconfiguration by adjusting a physical structure or a size of the antenna.

A physical structure or size design of a reflector of the reconfigurable antenna may affect radiation efficiency of the reconfigurable antenna. The reflector of the reconfigurable antenna uses a rectangular structure design, and an operating frequency width of the reflector of the rectangular structure design is relatively small, causing a decrease in radiation efficiency of the antenna at a high frequency band.

SUMMARY

This application provides an antenna and a wireless device to improve radiation efficiency of an antenna.

A first aspect of this application provides an antenna. The antenna includes a reflector and an active element. The reflector includes a multi-segment metal structure that includes a first metal structure and a second metal structure. A p-type, intrinsic, n-type (PIN) diode is disposed on the first metal structure. The first metal structure is connected to the second metal structure. The first metal structure is parallel to a polarization direction of the active element, and the second metal structure is perpendicular to the first metal structure. A length of the multi-segment metal structure of the reflector falls within a first value range. The first value range depends on a wavelength corresponding to an operating frequency band of the reflector. For example, the first value range is 0.225 to 0.275 times the wavelength corresponding to the operating frequency band of the reflector.

The reflector of the antenna provided in this application has the multi-segment metal structure. The first metal structure and the second metal structure in the multi-segment metal structure are of a bent structure. A mutual impedance between the reflector of this structure and the active element changes, so that an operating frequency width of the reflector is improved, thereby improving radiation efficiency of the antenna.

In a possible implementation, the PIN diode on the first metal structure may be connected in a plurality of manners, for example, may be welded or riveted. This is not specifically limited.

In this application, the plurality of connection manners of the PIN diode on the first metal structure improves implementability of the solution.

In a possible implementation, the multi-segment metal structure further includes a third metal structure. The third metal structure is connected to the second metal structure, and the third metal structure is parallel to the first metal structure.

The multi-segment metal structure provided in this application further includes the third metal structure, the first metal structure, and the second metal structure. The third metal structure in the multi-segment metal structure are of a bent structure. An impedance curve of the antenna of the reflector structure in a Smith chart is shortened, so that an operating frequency width of the reflector is improved, thereby improving radiation efficiency of the antenna.

In a possible implementation, a plurality of reflectors is evenly disposed on a circumference that uses the active element as a center. The reflector and the active element are disposed on a same horizontal plane. A distance between the reflector and the active element falls within a second value range. The second value range depends on the wavelength corresponding to the operating frequency band of the reflector. For example, the second value range is 0.17 to 0.25 times an operating wavelength, and the operating wavelength is the wavelength corresponding to the operating frequency band of the reflector.

In a possible implementation, the PIN diode is configured to control the reflector to be in an operating state or an off state.

In a possible implementation, two ends of the PIN diode are connected to an inductor in parallel. The inductor includes a distributed inductor and a DC blocking capacitor. The DC blocking capacitor includes a distributed capacitor or a lumped capacitor. An induction value of the distributed inductor is related to a length of the distributed inductor.

The length of the distributed inductor falls within a third value range. The third value range depends on the wavelength corresponding to the operating frequency band of the reflector. For example, the third value range is 0.05 to 0.5 times an operating wavelength, and the operating wavelength is the wavelength corresponding to the operating frequency band of the reflector. The distributed inductor may be of a plurality of shapes, for example, may be rectangular, a trapezoidal, or arc-shaped.

In a possible implementation, a resonance frequency of a resonant circuit comprising the PIN diode and the distributed inductor falls within an operating frequency band of the active element.

A second aspect of this application provides an antenna. The antenna includes a reflector and an active element. A PIN diode is disposed on the reflector. Two ends of the PIN diode are connected to an inductor in parallel. The inductor includes a distributed inductor and a DC blocking capacitor. The DC blocking capacitor includes a distributed capacitor or a lumped capacitor.

The reflector of the antenna provided in the second aspect of this application has the inductor connected in parallel. After the PIN diode of the reflector is connected to the inductor in parallel, a resonance frequency of the reflector can be changed, so that an operating frequency width of the reflector is improved, thereby improving radiation efficiency of the antenna.

In a possible implementation, a resonance frequency of a resonant circuit including the PIN diode and the distributed inductor falls within an operating frequency band of the active element.

In this application, the resonance frequency of the resonant circuit of the reflector falls within the operating frequency band of the active element, thereby improving radiation efficiency of the antenna.

In a possible implementation, an induction value of the distributed inductor is related to a length of the distributed inductor. The length of the distributed inductor falls within a first value range. For example, the first value range is 0.05 to 0.5 times an operating wavelength. The operating wavelength is a wavelength corresponding to an operating frequency band of the reflector.

In a possible implementation, the distributed inductor may be of a plurality of shapes. For example, the distributed inductor may be rectangular, a trapezoidal, or arc-shaped.

In a possible implementation, the reflector includes a multi-segment metal structure, which includes a first metal structure and a second metal structure. The PIN diode is disposed on the first metal structure. The first metal structure is connected to the second metal structure. A length of the multi-segment metal structure falls within a second value range. The first metal structure is parallel to a polarization direction of the active element. The second metal structure is perpendicular to the first metal structure.

The length of the multi-segment metal structure of the reflector falls within the second value range. The second value range depends on the wavelength corresponding to the operating frequency band of the reflector. For example, the second value range is 0.225 to 0.275 times an operating wavelength. The operating wavelength is the wavelength corresponding to the operating frequency band of the reflector.

In a possible implementation, the multi-segment metal structure further includes a third metal structure connected to the second metal structure, and the third metal structure is parallel to the first metal structure.

In a possible implementation, a plurality of reflectors is evenly disposed on a circumference that uses the active element as a center, and the reflector and the active element are disposed on a same horizontal plane.

In an implementation, a distance between the reflector and the active element falls within a third value range. The third value range depends on the wavelength corresponding to the operating frequency band of the reflector. For example, the third value range is 0.17 to 0.25 times an operating wavelength. The operating wavelength is the wavelength corresponding to the operating frequency band of the reflector.

In a possible implementation, the PIN diode is configured to control the reflector to be in an operating state or an off state.

A third aspect of this application provides a wireless device. The wireless device includes a radio frequency circuit, a switch circuit, and an antenna. The antenna is the antenna according to any one of the first aspect and the possible implementations of the first aspect, or the antenna according to any one of the second aspect and the possible implementations of the second aspect. The radio frequency circuit is connected to an active element in the antenna. The switch circuit is connected to a reflector in the antenna.

DESCRIPTION OF EMBODIMENTS

Figure 1:
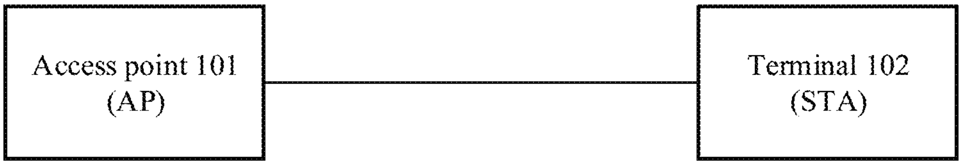
FIG. 1 is a schematic diagram of a system architecture of an antenna according to an embodiment this application.

In this application, terms such as “first”, “second”, “third”, and “fourth” (if exists) in the specification, the claims, and the accompanying drawings are intended to distinguish between similar objects but do not necessarily indicate a specific order or sequence. It should be understood that the data termed in such a way is interchangeable in proper circumstances so that embodiments described herein can be implemented in orders other than the order illustrated or described herein. Moreover, the terms “include”, “contain” and any other variants mean to cover non-exclusive inclusion. For example, a process, method, system, product, or device that includes a list of steps or units is not necessarily limited to those expressly listed steps or units, but may include other steps or units that are not expressly listed or inherent to the process, method, product, or device.

Some terms in this application are described below, to help a person skilled in the art have a better understanding.

A terminal is a device that provides voice and/or data connectivity for a user, for example, a handheld device or a vehicle-mounted device with a wireless connection function. Some examples of the terminal are a mobile phone, a tablet computer, a notebook computer, a palmtop computer, and a mobile Internet device (MID), and a wearable device. The wearable device is, for example, virtual reality (VR) glasses, a smart watch, a smart band, or a pedometer.

A reconfigurable antenna means that a relationship between array elements in a multi-antenna array is not fixed and may be adjusted based on an actual case. The reconfigurable antenna mainly implements antenna performance reconfiguration by adjusting a state variable device. Reconfigurable antennas may be classified into a frequency reconfigurable antenna, a radiation pattern reconfigurable antenna, a polarization reconfigurable antenna, and a multi-electromagnetic-parameter reconfigurable antenna based on functions. A reflector of the reconfigurable antenna is connected to a PIN diode in series. The reflector of the reconfigurable antenna changes distribution of an induced current on the reflector by switching a switching status of the PIN diode to reconfigure a beam of the antenna.

The PIN diode is also referred to as a phase-shift switching diode. Compared with a common PN junction diode of a two-layer structure, an I layer is introduced to the PIN diode, that is, a low-doped I layer made of an intrinsic semiconductor material is inserted between a P layer made of a P-type semiconductor material and an N layer made of an N-type semiconductor material in the common PN junction diode. If the I layer material is a low-doped P-type semiconductor, the diode may be referred to as a it-type PIN diode. If the I layer material is a low-doped N-type semiconductor, the diode may be referred to as a v-type PIN diode. In the PIN diode, the P layer and the N layer are usually made of high-doped semiconductor materials. Due to the I layer, the PIN diode usually has a wider depletion layer, a larger contact resistance, and a smaller contact capacitance than a common diode. In circuits at radio frequency and microwave levels, the PIN diode is often used as a microwave switch, a phase shifter, or an attenuator.

A full name of a standing wave ratio is a voltage standing wave ratio (VSWR). The voltage standing wave ratio is an amplitude ratio between an antinode voltage and a trough voltage of a standing wave. When the standing wave ratio is equal to 1, it indicates that an impedance of a feeder completely matches that of an antenna. In this case, all high-frequency energy is radiated by the antenna, and therefore there is no energy reflection loss. When the standing wave ratio is infinite, it indicates total reflection, and therefore energy is not radiated at all.

The foregoing explains some terms in this application, and the following describes an antenna provided in this application.

FIG. 1 is a schematic diagram of a system architecture to which an antenna is applied according to an embodiment this application. The system architecture mainly includes an access point 101 and a terminal 102.

The access point 101 may include a wireless switch, a wireless router, a wireless network interface card, a wireless bridge, or the like, and is not specifically limited. The access point 101 is mainly configured to exchange data with the terminal 102. The access point 101 may also be responsible for network management of the terminal 102. For example, the access point 101 manages dormancy and roaming of the terminal 102. The terminal 102 may access a network by using the access point 101. The terminal includes an electronic device such as a mobile phone or a computer.

The antenna provided in this application may be applied to the system architecture, and in particular, to an indoor high-density access local area network scenario. Specifically, the antenna provided in this application may be applied to the access point 101 or the terminal 102.

The foregoing describes the system architecture and the application scenario of this application, and the following describes the antenna provided in an embodiment this application.

Figure 2:
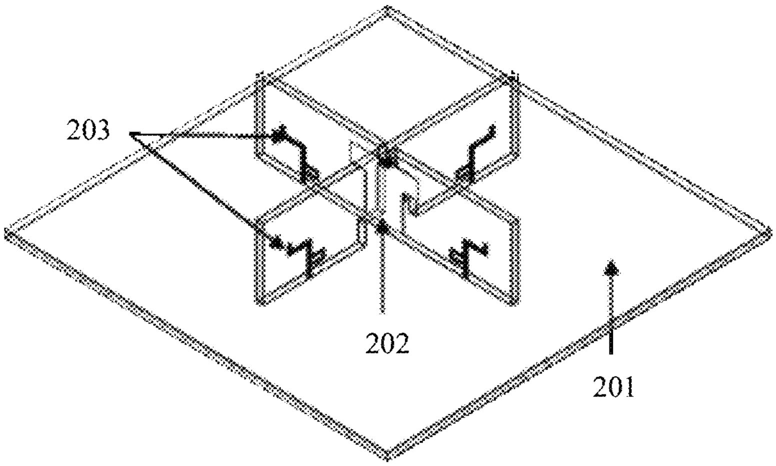
FIG. 2 is a schematic diagram of a structure of an antenna according to an embodiment this application.

FIG. 2 is a schematic diagram of a structure of an antenna according to an embodiment this application. The antenna provided in this embodiment includes an active element 202 and a reflector 203. The active element 202 and the reflector 203 are vertically disposed on a horizontal plane 201. The reflector 203 is parallel to a polarization direction of the active element 202, and the polarization direction of the active element 202 is vertical.

The reflector 203 is disposed on a circumference that uses the active element 202 as a center. A distance between the reflector 203 and the active element 202 is a radius of the circumference. A value range of the circumference radius is 0.17 to 0.25 times an operating wavelength of the reflector. The operating wavelength is a wavelength corresponding to an operating frequency band of the reflector.

A quantity of reflectors in the antenna provided in this application is not limited. FIG. 2 shows only an example in which there are four reflectors. Alternatively, there may be three reflectors. This is not specifically limited.

FIG. 2 shows only an example of the antenna provided in an embodiment this application. In another example, the active element may be alternatively horizontally polarized. When the active element is polarized in a horizontal direction, reflector arrangement is correspondingly adjusted.

The following describes an example of the reflector of the antenna.

Figure 3A:
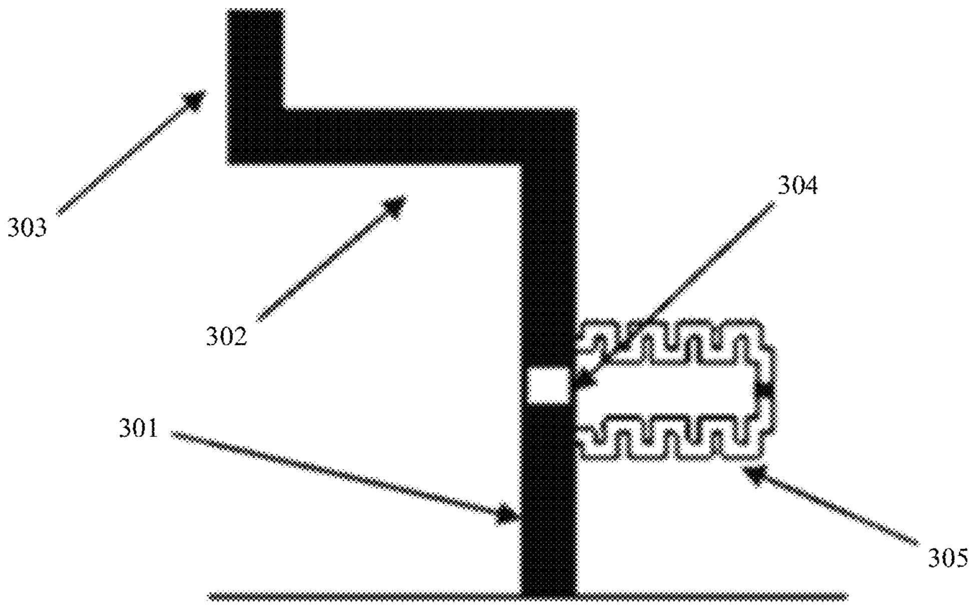
FIG. 3*a* is a schematic diagram of a structure of a reflector of an antenna according to an embodiment this application.

FIG. 3*a* is a schematic diagram of a structure of a reflector of an antenna according to an embodiment this application. The reflector includes a first metal structure 301, a second metal structure 302, and a third metal structure 303. The first metal structure 301, the second metal structure 302, and the third metal structure 303 are sequentially connected.

The first metal structure 301 is vertically disposed on the horizontal plane. The first metal structure 301 is perpendicular to the second metal structure 302. The second metal structure 302 is perpendicular to the third metal structure 303. The first metal structure 301 is parallel to the polarization direction of the active element.

A total length of the first metal structure 301, the second metal structure 302, and the third metal structure 303 is 0.225 to 0.275 times an operating wavelength of the reflector. The operating wavelength is a wavelength corresponding to an operating frequency band of the reflector.

A PIN diode 304 is disposed on the first metal structure 301. Two ends of the PIN diode 304 are connected to an inductor 305 in parallel. The inductor 305 includes a distributed inductor and a DC blocking capacitor.

The PIN diode 304 is configured to control the reflector to be in an operating state or an off state. A connection process between the PIN diode 304 and the first metal structure is not limited, for example, may be welding, or may be riveting.

In this application, the PIN diode 304 may also be replaced with another diode or a switching component, and is not specifically limited.

Figure 3B:
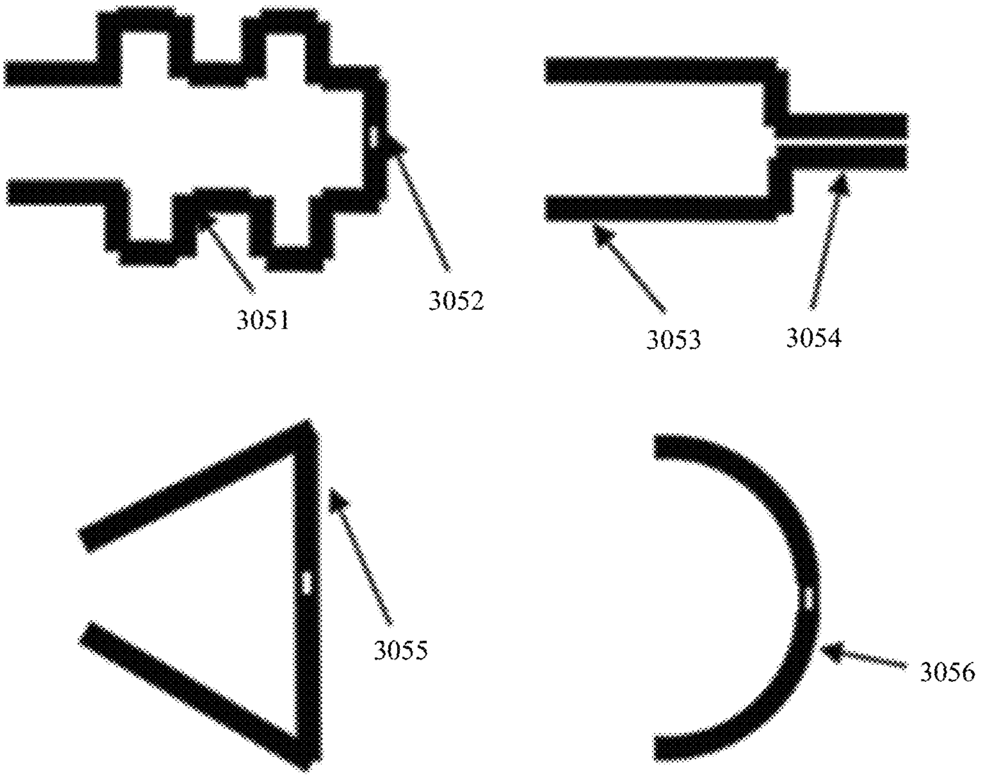
FIG. 3*b* is a schematic diagram of a structure of an inductor in a reflector according to an embodiment this application.

FIG. 3*b* is a schematic diagram of several structures of the inductor 305. In an example shown in FIG. 3*b*, the inductor 305 includes a distributed inductor 3051 and a DC blocking capacitor 3052. The distributed inductor 3051 is of a bent metal structure. An induction value of the distributed inductor 3051 is related to a total length of the bent metal structure. The total length of the bent metal structure is 0.05 to 0.5 times the operating wavelength of the reflector.

In another example, the distributed inductor 3051 may be a rectangular distributed inductor 3053, may be a trapezoidal distributed inductor 3055, or may be an arc-shaped distributed inductor 3056, and is not specifically limited. A total length of a metal structure of each of the plurality of types of distributed inductors is 0.05 to 0.5 times the operating wavelength of the reflector.

In another example, the DC blocking capacitor 3052 may be a distributed capacitor 3054, or may be a lumped capacitor, and is not specifically limited.

Figure 4A:
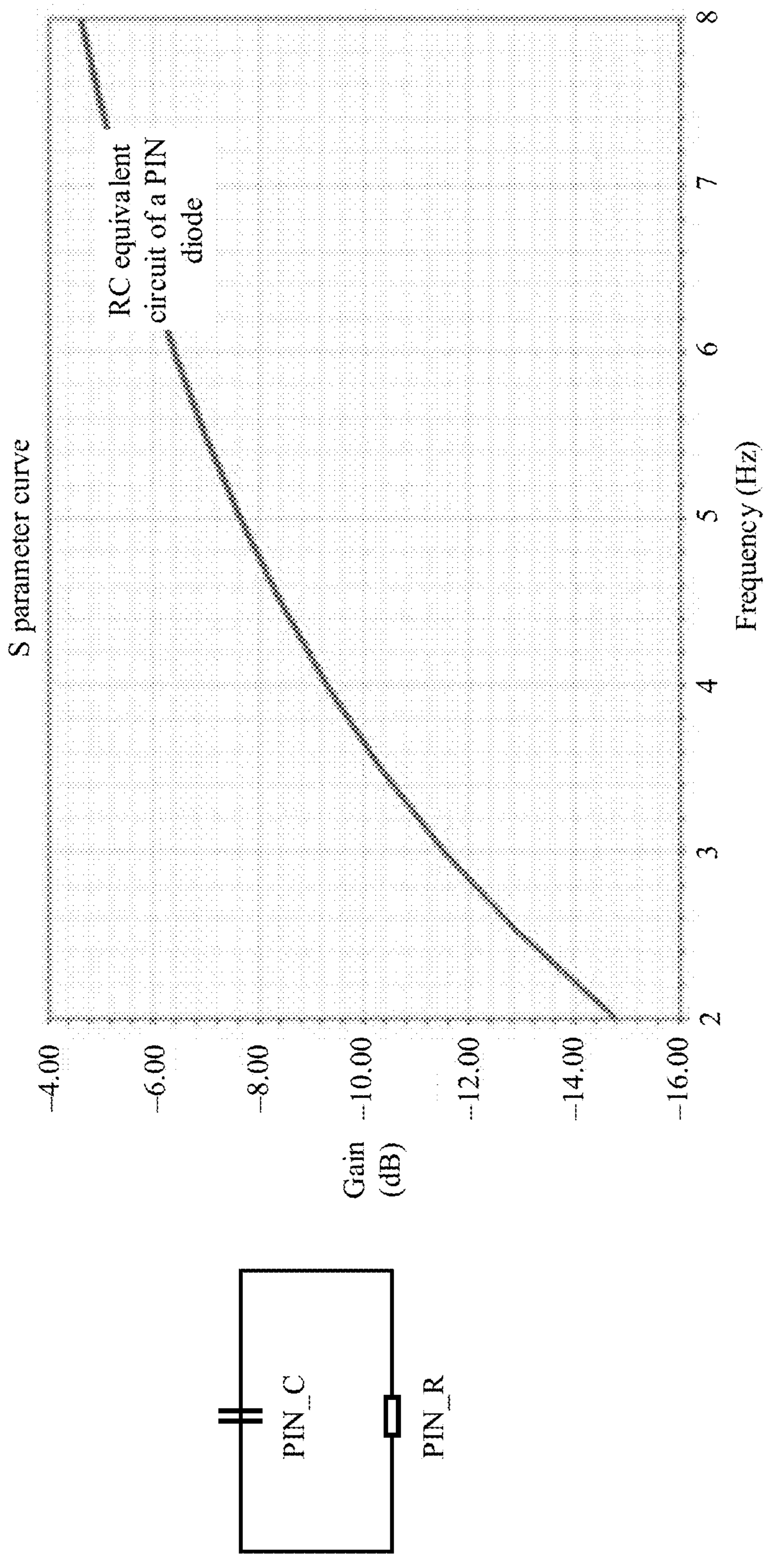
FIG. 4*a* is a schematic diagram of an equivalent circuit of a reflector according to an embodiment this application.

In another example of the reflector of the antenna provided in this application, the reflector includes only a first metal structure 301, a second metal structure 302, and a third metal structure 303. Two ends of a PIN diode on the first metal structure 301 are connected to an inductor in parallel. In this example, when the PIN diode 304 is in the OFF state, an equivalent circuit of the reflector is an RC parallel circuit. The RC parallel circuit is shown in FIG. 4*a*. In this case, an isolation degree of the reflector decreases as a frequency increases.

Figure 4B:
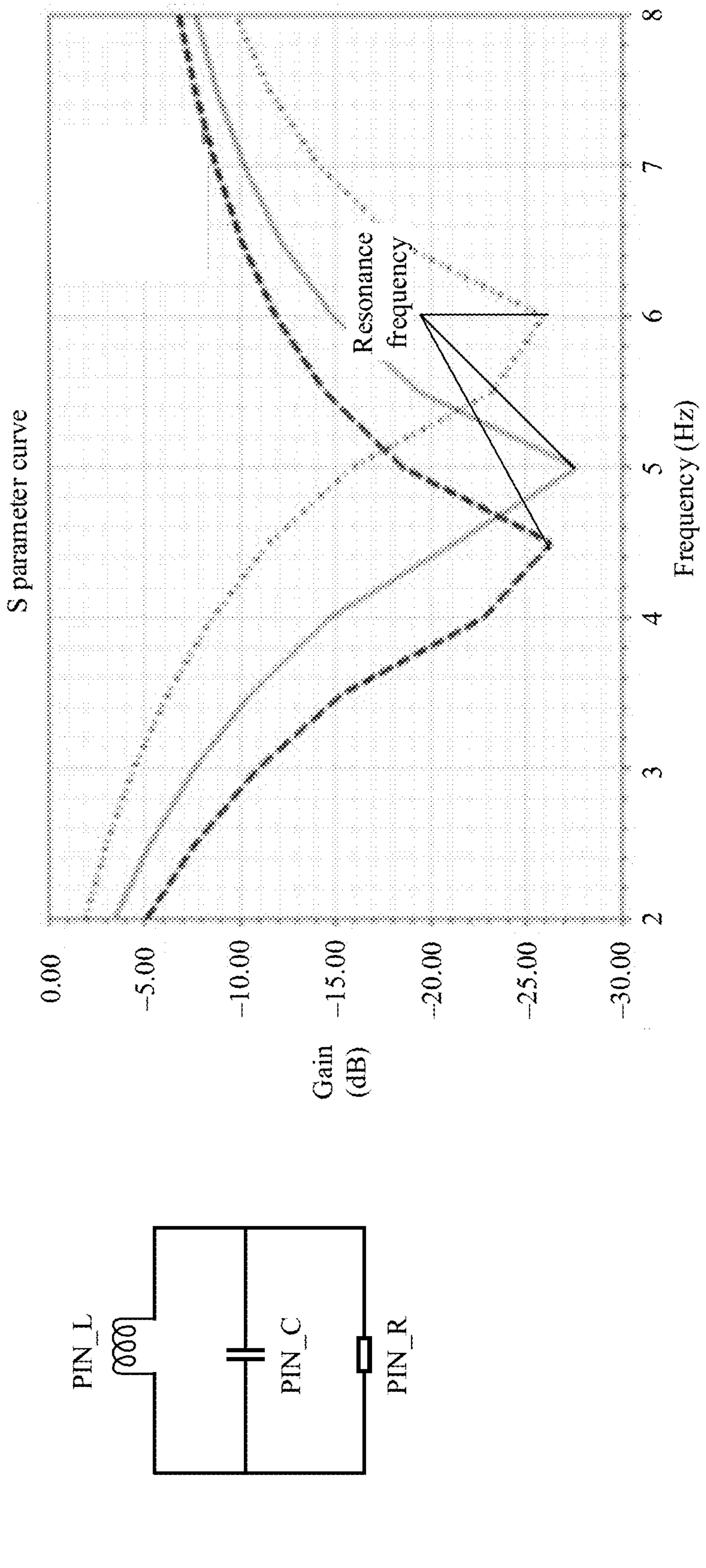
FIG. 4*b* is a schematic diagram of an equivalent circuit of a reflector according to an embodiment this application.

In the example shown in FIG. 3*a*, the two ends of the PIN diode 304 are connected to the inductor 305 in parallel. After the inductor 305 is connected in parallel, an equivalent circuit of the reflector is a resistor-inductor-capacitor (RLC) parallel circuit. The RLC parallel circuit is shown in FIG. 4*b*. In the circuit, at a resonance frequency, an isolation degree is very large. The reflector is in a cut-off state, so that a mutual impedance between the reflector and the active element is reduced, thereby improving radiation efficiency of the antenna.

Further, an induction value of the inductor 305 shown in FIG. 3*a* in this application may be adjusted, and specifically, the inductance value is adjusted by changing a size of the distributed inductor of the inductor 305, to change an operating resonance frequency of the reflector.

Figure 5:
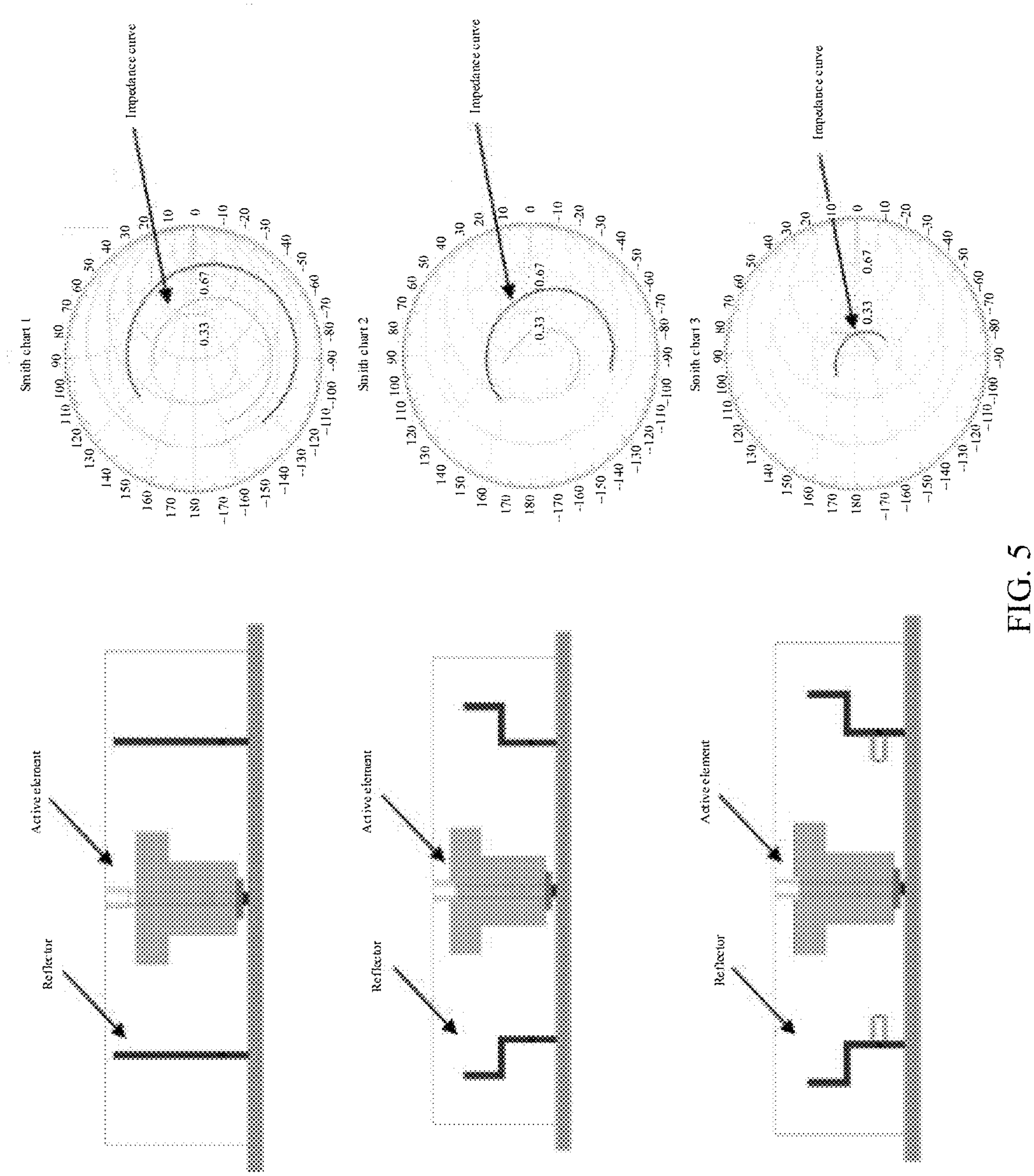
FIG. 5 is a schematic diagram of impedance curves in different reflector structures according to an embodiment this application.

FIG. 5 shows Smith charts corresponding to reflectors of several types of antennas according to an embodiment this application. An impedance curve in the Smith chart may reflect an antenna impedance matching effect.

As shown in FIG. 5, in three Smith charts in FIG. 5, a curve in the third Smith chart is an impedance curve of an antenna corresponding to the reflector shown in FIG. 3*a*. It can be learned, by comparing impedance curves of three types of reflectors, that the impedance curve of the reflector shown in FIG. 3*a* is closer to an antenna impedance matching point than the impedance curves in two above charts. The impedance matching point is a center point of the Smith chart.

In this application, compared with an antenna corresponding to the first impedance curve, in an antenna corresponding to the third impedance curve shown in FIG. 5, a bandwidth whose omnidirectional standing wave ratio is less than 2 is increased by 32%, and a bandwidth whose directional standing wave ratio less than 2 is increased by 32%.

An impedance curve in the second Smith chart shown in FIG. 5 is an impedance curve corresponding to a reflector in which a PIN diode is connected to an inductor in parallel according to an embodiment of this application. It can be learned from the impedance curve in the second Smith chart that an impedance curve of a reflector of a three-segment metal structure is closer to the antenna impedance matching point than a one-segment rectangular reflector structure.

In this application, compared with the antenna corresponding to the first impedance curve, in an antenna corresponding to the second impedance curve shown in FIG. 5, a bandwidth whose omnidirectional standing wave ratio is less than 2 does not change, and a bandwidth whose directional standing wave ratio less than 2 is increased by 15%.

Figure 6:
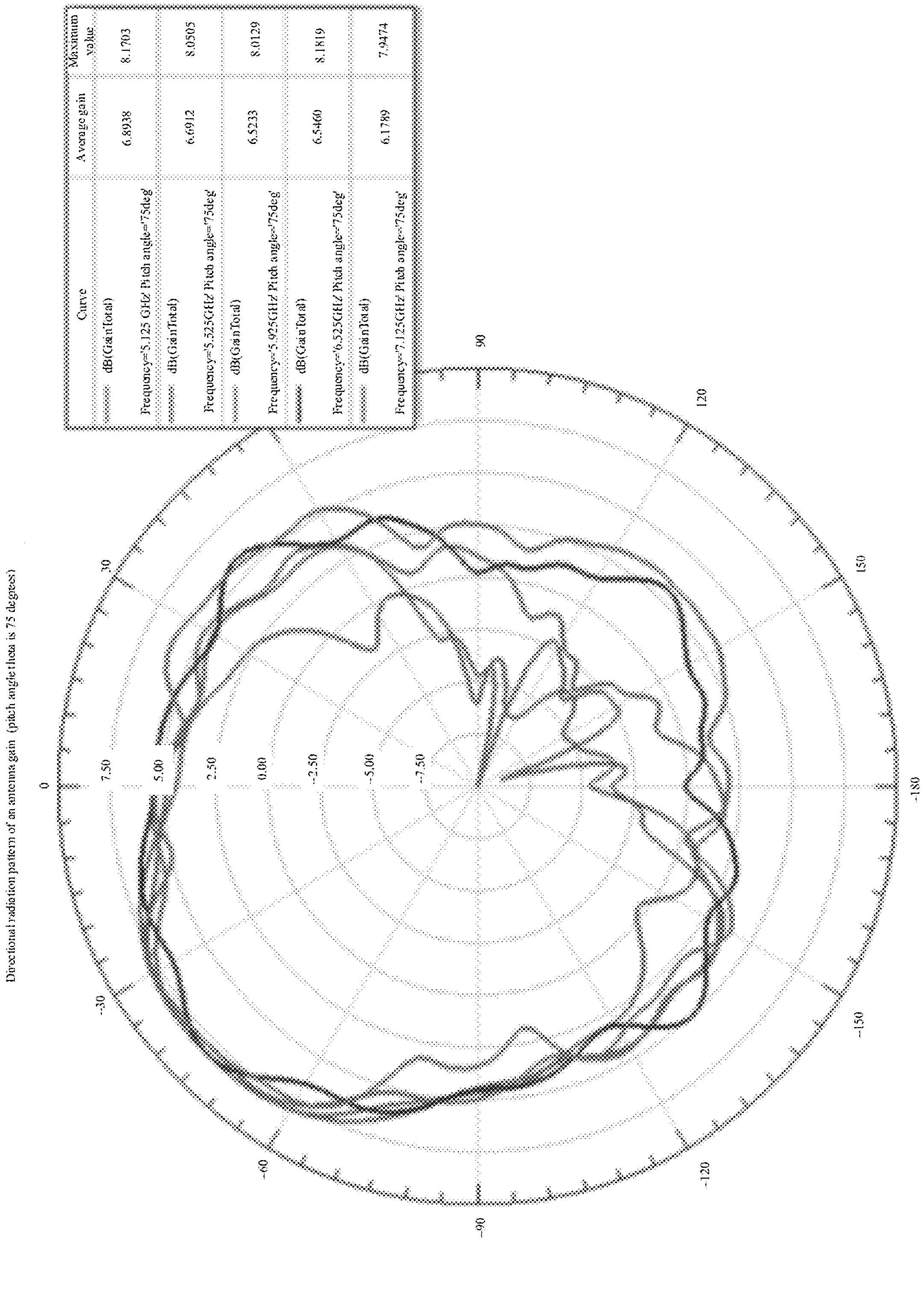
FIG. 6 is a schematic diagram of a beam direction of an antenna according to an embodiment this application.

FIG. 6 is a directional radiation pattern of an antenna whose pitch angle is 75 degrees according to an embodiment this application. A reflector of the antenna is the reflector shown in FIG. 3*a*. An operating bandwidth of the antenna may reach 5.15 GHz to 7.15 GHz. It can be learned from FIG. 6 that, in a ±45 degree range of a maximum gain direction of the antenna, when the antenna operates at different frequencies, average gains of the antenna are all greater than 6 decibels relative to isotropic (dBi). dBi is a power gain unit, and a reference of dBi is an omnidirectional antenna.

The foregoing describes the antenna provided in an embodiment this application, and the following describes a wireless device provided in an embodiment this application.

Figure 7:
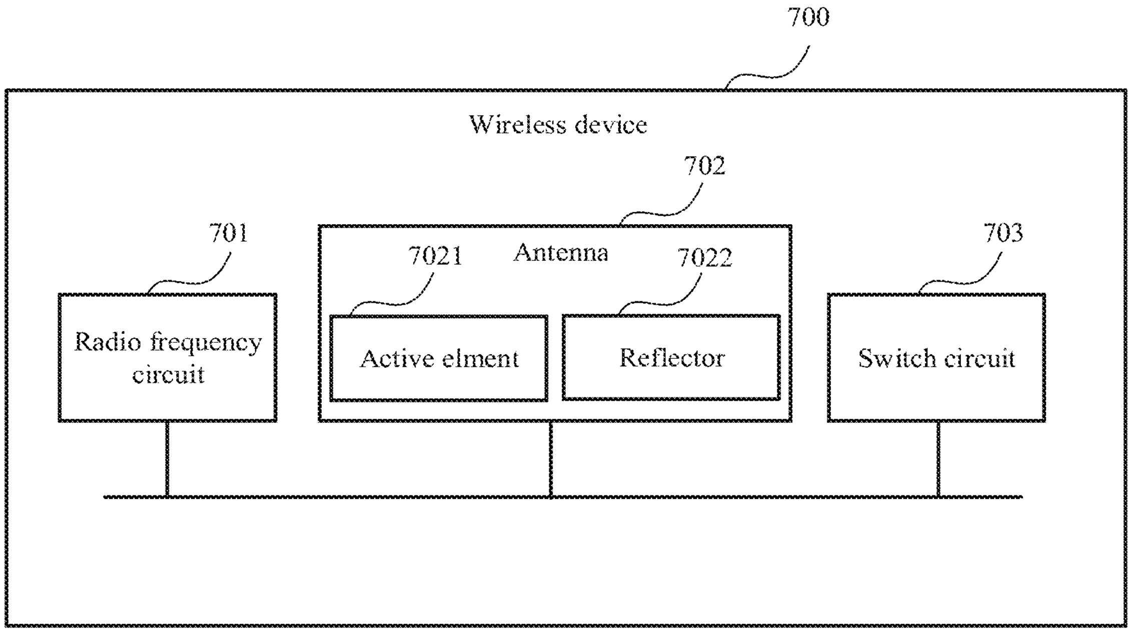
FIG. 7 is a schematic diagram of a structure of a wireless device according to an embodiment this application.

FIG. 7 is a schematic diagram of a wireless device according to an embodiment this application. A wireless device 700 provided in this embodiment includes a radio frequency circuit 701, an antenna 702, and a switch circuit 703. The antenna 702 includes an active element 7021 and a reflector 7022. The antenna 702 is the antenna described in the foregoing embodiments. The radio frequency circuit 701 is connected to the active element 7021 in the antenna 702. The switch circuit 703 is connected to the reflector 7022 in the antenna 702.

Figure 8:
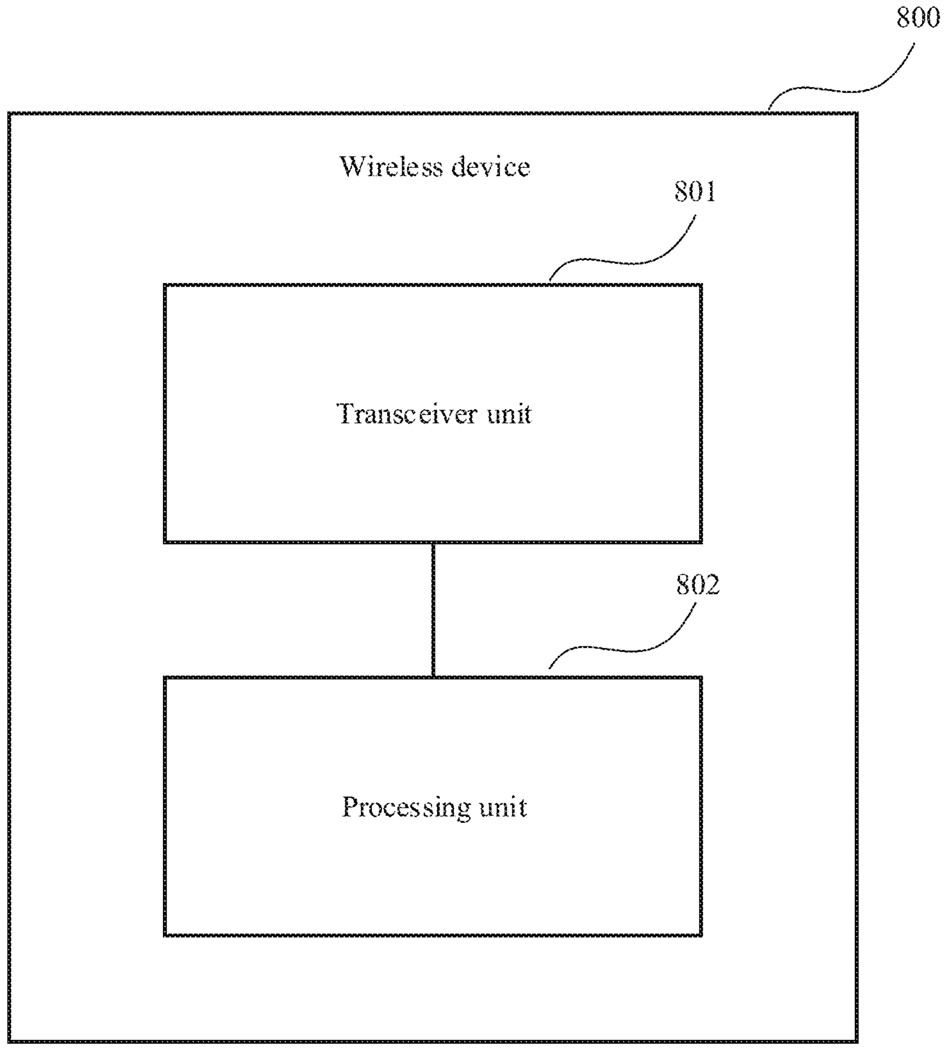
FIG. 8 is a schematic diagram of another structure of a wireless device according to an embodiment this application.

FIG. 8 is a schematic diagram of another wireless device according to an embodiment this application. A wireless device 800 provided in this embodiment includes a transceiver unit 801 and a processing unit 802. The transceiver unit 801 is configured to perform data receiving or sending with another network device. The processing unit 802 is configured to control data exchange between the transceiver unit 801 and the other network device.

The transceiver unit 801 in the wireless device 800 is equivalent to the antenna 702 in the wireless device 700. The processing unit 802 in the wireless device 800 may be equivalent to the radio frequency circuit 701 or the switch circuit 703 in the wireless device 700.

A person skilled in the art may clearly understand that, for the purpose of convenient and brief description, for detailed working processes of the foregoing system, apparatuses, and units, refer to corresponding processes in the foregoing method embodiments. Details are not described herein again.

What is claimed is:

1. An antenna comprising:

an active element located at a center of a circumference of the antenna; and a plurality of reflectors evenly disposed on the circumference, wherein a reflector in the plurality of reflectors comprises a multi-segment metal structure and a diode, wherein the multi-segment metal structure comprises a first metal structure, a second metal structure, and a third metal structure, wherein the first metal structure is parallel to a polarization direction of the active element, wherein the second metal structure is connected at a first end to a top of the first metal structure and is perpendicular to the first metal structure, wherein the second metal structure extends in a direction away from the active element, wherein the third metal structure is connected to a second end of the second metal structure and extends vertically from the second metal structure, and wherein the diode is disposed on the first metal structure between a first portion of the first metal structure and a second portion of the first metal structure.

2. The antenna of claim 1, wherein the third metal structure is parallel to the first metal structure.

3. The antenna of claim 1, wherein a distance between the reflector and the active element is within a first value range, wherein the first value range depends on a wavelength corresponding to an operating frequency band of the reflector.

4. The antenna of claim 1, wherein the diode is a p-type, intrinsic, and n-type (PIN) diode configured to control the reflector to be in an operating state or an off state.

5. The antenna of claim 4, wherein a first end and a second end of the PIN diode are connected to an inductor in parallel, wherein the inductor comprises a distributed inductor and a DC blocking capacitor, and wherein the DC blocking capacitor comprises a distributed capacitor or a lumped capacitor.

6. The antenna of claim 5, further comprising a resonant circuit comprising the PIN diode and the distributed inductor, wherein a resonant frequency of the resonant circuit is within an operating frequency band of the active element.

7. The antenna of claim 5, wherein a length of the distributed inductor is within a third value range, wherein the third value range depends on a wavelength corresponding to an operating frequency band of the reflector.

8. The antenna of claim 5, wherein the distributed inductor is a rectangular distributed inductor.

9. The antenna of claim 5, wherein the multi-segment metal structure has a length within a first value range, wherein the first value range is 0.225 to 0.275 times a wavelength corresponding to an operating frequency band of the reflector.

10. An antenna comprising:

an active element located at a center of a circumference of the antenna;

an inductor comprising a distributed inductor and a DC blocking capacitor, wherein the DC blocking capacitor comprises a distributed capacitor or a lumped capacitor; and a plurality of reflectors evenly disposed on the circumference, wherein a reflector in the plurality of reflectors comprises a multi-segment metal structure and a p-type, intrinsic, and n-type (PIN) diode, wherein the multi-segment metal structure comprises a first metal structure, a second metal structure, and a third metal structure, wherein the first metal structure extends vertically from a horizontal plane, wherein the second metal structure is connected at a first end to a top of the first metal structure and is perpendicular to the first metal structure, wherein the second metal structure extends in a direction away from the active element, and wherein the third metal structure is connected to a second end of the second metal structure and extends vertically from the second metal structure.

11. The antenna of claim 10, further comprising a resonant circuit comprising the PIN diode and the distributed inductor, wherein a resonant frequency of the resonant circuit is within an operating frequency band of the active element.

12. The antenna of claim 10, wherein the PIN diode is disposed on the first metal structure between a first portion of the first metal structure and a second portion of the first metal structure.

13. The antenna of claim 12, wherein a length of the distributed inductor is within a first value range of 0.05 to 0.5 times an operating wavelength of the reflector.

14. The antenna of claim 12, wherein a distance between the reflector and the active element is within a second value range, wherein the second value range depends on a wavelength corresponding to an operating frequency band of the reflector.

15. A wireless device comprising:

a radio frequency circuit;

a switch circuit; and an antenna comprising:

an active element located at a center of a circumference of the antenna; and a plurality of reflectors evenly disposed on the circumference, wherein a reflector in the plurality of reflectors is connected to the switch circuit and comprises a multi-segment metal structure and a diode, wherein the multi-segment metal structure comprises a first metal structure, a second metal structure, and a third metal structure, wherein the first metal structure is parallel to a polarization direction of the active element, wherein the second metal structure is connected at a first end to a top of the first metal structure and is perpendicular to the first metal structure, wherein the second metal structure extends in a direction away from the active element, wherein the third metal structure is connected to a second end of the second metal structure and extends vertically from the second metal structure, and wherein the diode is disposed on the first metal structure between a first portion of the first metal structure and a second portion of the first metal structure.

16. A wireless device comprising:

a radio frequency circuit;

a switch circuit; and an antenna comprising:

an active element located at a center of a circumference of the antenna and connected to the radio frequency circuit;

an inductor comprising a distributed inductor and a DC blocking capacitor, wherein the DC blocking capacitor comprises a distributed capacitor or a lumped capacitor; and a plurality of reflectors evenly disposed on the circumference, wherein a reflector in the plurality of reflectors is connected to the switch circuit and comprises a multi-segment metal structure and a p-type, intrinsic, and n-type (PIN) diode, wherein the multi-segment metal structure comprises a first metal structure, a second metal structure, and a third metal structure, wherein the first metal structure extends vertically from a horizontal plane, wherein the second metal structure is connected at a first end to a top of the first metal structure and is perpendicular to the first metal structure, wherein the second metal structure extends in a direction away from the active element, and wherein the third metal structure is connected to a second end of the second metal structure and extends vertically from the second metal structure.

17. The wireless device of claim 16, wherein the antenna further comprises a resonant circuit comprising the PIN diode and the distributed inductor, and wherein a resonant frequency of the resonant circuit is within an operating frequency band of the active element.

18. The wireless device of claim 17, wherein the diode is disposed on the first metal structure between a first portion of the first metal structure and a second portion of the first metal structure.

19. The antenna of claim 10, wherein the distributed inductor is a trapezoidal distributed inductor.

20. The antenna of claim 10, wherein the distributed inductor is an arc-shaped distributed inductor.

* * * * *